(12) United States Patent
Tovar Ramos

(10) Patent No.: US 11,976,879 B2
(45) Date of Patent: *May 7, 2024

(54) PROCESS FOR THE SEPARATION AND LIQUEFACTION OF METHANE AND CARBON DIOXIDE WITH PRE-SEPARATION UPSTREAM OF THE DISTILLATION COLUMN

(71) Applicant: L'Air Liquide Société Anonyme pour l'Etude et l'Exploitation des Procédés Georges Claude, Paris (FR)

(72) Inventor: Jorge Ernesto Tovar Ramos, Cachan (FR)

(73) Assignee: L'Air Liquide, Societe Anonyme Pour L'Etude Et L'Exploitation Des Procedes, Georges Claude Paris (FR)

( * ) Notice: Subject to any disclaimer, the term of this patent is extended or adjusted under 35 U.S.C. 154(b) by 29 days.

This patent is subject to a terminal disclaimer.

(21) Appl. No.: 17/836,171

(22) Filed: Jun. 9, 2022

(65) Prior Publication Data
US 2022/0397341 A1    Dec. 15, 2022

(51) Int. Cl.
F25J 3/02    (2006.01)
F25J 1/00    (2006.01)
F25J 1/02    (2006.01)

(52) U.S. Cl.
CPC ........... *F25J 1/0238* (2013.01); *F25J 1/0022* (2013.01); *F25J 1/0082* (2013.01); *F25J 3/0266* (2013.01); *F25J 2210/66* (2013.01); *F25J 2215/60* (2013.01); *F25J 2215/80* (2013.01); *F25J 2245/02* (2013.01); *F25J 2290/12* (2013.01)

(58) Field of Classification Search
CPC .......... F25J 3/067; F25J 3/0266; F25J 3/0233; F25J 2220/40; F25J 2220/60
See application file for complete search history.

(56) References Cited

U.S. PATENT DOCUMENTS 3,921,411 A    11/1975    Gleich
4,152,129 A    5/1979    Trentham et al.
5,681,360 A *  10/1997    Siwajek .................. C07C 7/005
                                                    95/149

(Continued)

FOREIGN PATENT DOCUMENTS

CA    2984085 A1 *  5/2018   ............. B01D 53/00
WO    WO 2010 144288    12/2010

(Continued)

OTHER PUBLICATIONS

Yousef, A.M. et al., New approach for biogas purification using cryogenic separation and distillation process of CO2 capture, Energy, vol. 56, May 16, 2018, 328-351.

(Continued)

*Primary Examiner* — Brian M King
(74) *Attorney, Agent, or Firm* — Elwood L. Haynes

(57) ABSTRACT

A combined plant for cryogenic separation and liquefaction of methane and carbon dioxide in a biogas stream, including a mixing means, a compressor, a first exchanger, a distillation column, a second exchanger, a separating means, an expanding means, and a separator vessel. Wherein, the mixing means is configured such that the recycle gas is the overhead vapour stream, and the first exchanger and the expanding means are combined.

8 Claims, 1 Drawing Sheet

(56) References Cited

U.S. PATENT DOCUMENTS

| | | | |
|---|---|---|---|
| 5,842,357 A | 12/1998 | Siwajek et al. | |
| 5,956,971 A * | 9/1999 | Cole | F25J 1/0202 |
| | | | 62/631 |
| 2011/0041550 A1 | 2/2011 | Menzel et al. | |
| 2013/0036765 A1 | 2/2013 | Renaud | |
| 2013/0167583 A1* | 7/2013 | Stallmann | F25J 3/067 |
| | | | 62/617 |
| 2014/0144177 A1* | 5/2014 | Stallman | B01D 53/62 |
| | | | 62/606 |
| 2015/0159945 A1 | 6/2015 | Valencia et al. | |
| 2015/0174523 A1* | 6/2015 | Darde | F25J 3/067 |
| | | | 95/41 |
| 2019/0001263 A1* | 1/2019 | Prince | F25J 3/0209 |
| 2019/0186825 A1* | 6/2019 | Noureldin | F25J 5/002 |
| 2021/0172677 A1 | 6/2021 | Terrien et al. | |

FOREIGN PATENT DOCUMENTS

| | | |
|---|---|---|
| WO | WO 2011 135538 | 11/2011 |
| WO | WO 2012 029021 | 3/2012 |
| WO | WO 2016 128110 | 8/2016 |
| WO | WO 2019 122660 | 6/2019 |

OTHER PUBLICATIONS

French Search Report for corresponding FR 2106090, dated Feb. 11, 2022.

* cited by examiner

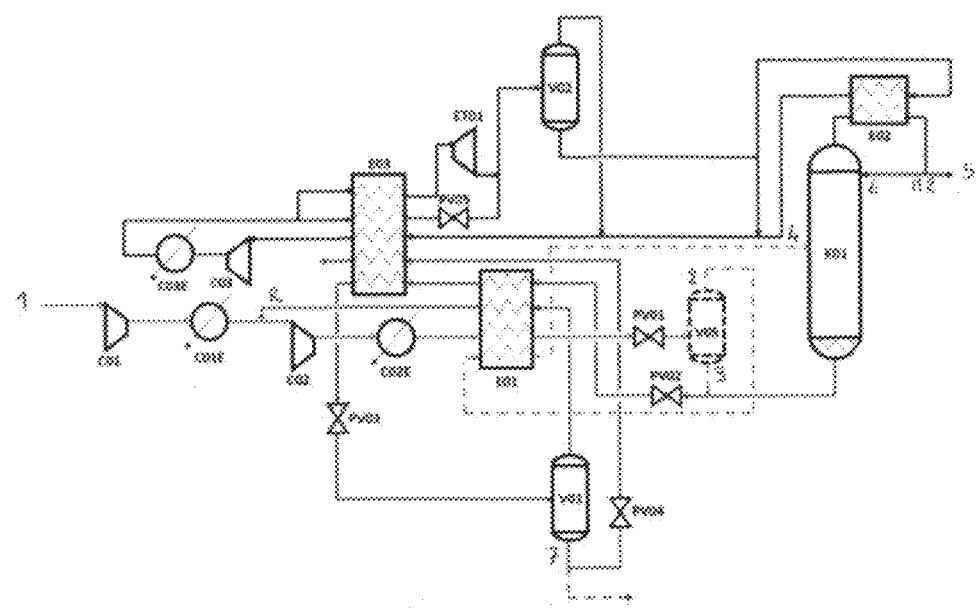

PROCESS FOR THE SEPARATION AND LIQUEFACTION OF METHANE AND CARBON DIOXIDE WITH PRE-SEPARATION UPSTREAM OF THE DISTILLATION COLUMN

CROSS REFERENCE TO RELATED APPLICATIONS

This application claims the benefit of priority under 35 U.S.C. § 119 (a) and (b) to French Patent Application No. 2106090, filed Jun. 9, 2021, the entire contents of which are incorporated herein by reference.

BACKGROUND

The present invention relates to a facility and a process for producing liquid methane and liquid carbon dioxide from a biogas stream.

Biogas is the gas produced during the degradation of organic matter in the absence of oxygen (anaerobic fermentation), also known as methanization. This may be natural degradation—it is thus observed in marshland or in household waste landfills—but the production of biogas may also result from the methanization of waste in a dedicated reactor referred to as a methanizer or digester.

By virtue of its main constituents—methane and carbon dioxide—biogas is a powerful greenhouse gas; at the same time, it also constitutes a source of renewable energy that is appreciable in the context of the increasing scarcity of fossil fuels.

Biogas predominantly contains methane ($CH_4$) and carbon dioxide ($CO_2$), in proportions which can vary according to the way in which it is obtained, but also contains, in smaller proportions, water, nitrogen, hydrogen sulfide, oxygen, and also other organic compounds, in trace amounts.

Depending on the organic matter that has been degraded and on the techniques used, the proportions of the components differ, although on average biogas includes, on a dry gas basis, from 30% to 75% methane, from 15% to 60% $CO_2$, from 0 to 15% nitrogen, from 0 to 5% oxygen and trace compounds.

After a step of pretreating these contaminants, the biogas can be used as is to supply a boiler or a cogeneration unit, or else purified to obtain a gas which meets the specifications for injection into the natural gas network (e.g.: 3% $CO_2$ max).

In numerous regions of Europe and throughout the world, the natural gas network is not always accessible close to the areas of production of fermentable waste. Furthermore, while there is no need for heat at the biogas production site, depending on the purchase price of electricity, cogeneration does not always have a sufficient output to render profitable the major investment in a digestion unit. It is then advantageous in these two cases to transport the biogas to a distribution or consumption point. The liquefaction of biogas after purification would make it possible to transport biomethane at a lower cost. According to the regulations in certain geographic zones, it is forbidden to release $CH_4$ into the environment; this adds an additional constraint and restricts the choice of biogas separation processes to highly effective methods.

Today, biogas purification processes are mainly based on absorption, permeation or adsorption techniques. These systems then require the addition of a supplementary module in order to obtain biomethane in the liquid form. Moreover, in the majority of cases, the content of $CO_2$ in the biogas at the end of this purification step is still too high to supply such liquefaction systems.

A system of cryotrapping based on the principles of reversible exchangers has been proposed. This system is based on the solidification of the $CO_2$ present in the biogas on a cold surface (trapping), followed by a step of sublimation or liquefaction of the $CO_2$ using a hot source. For a continuous production of biomethane, is then necessary to work with several exchangers in parallel. Their solution makes it possible to separate and liquefy the methane and the $CO_2$ in two separate steps, but it is not possible to recover the cold used in the solidification of the $CO_2$.

Starting from there, one problem that arises is that of providing a method of separating and liquefying methane and $CO_2$ from biogas with a minimum loss of methane and using a minimum number of operations.

SUMMARY

One solution of the present invention is a combined facility for cryogenic separation and liquefaction of methane and carbon dioxide in a biogas stream, comprising:
  a means M1 for mixing the biogas 1 with a recycle gas R,
  a compressor for compressing the mixture to the distillation pressure,
  an exchanger E01 for cooling the compressed mixture,
  a separator vessel V05 for receiving the mixture from the exchanger E01 and for recovering an overhead vapour 2 and a $CO_2$-enriched liquid 3,
  a means M4 for cooling the overhead vapour,
  a distillation column K01 supplied with the cooled overhead vapour 4 and making it possible to produce methane at the top of the column and a $CO_2$-enriched liquid at the bottom of the column,
  an exchanger E02 for liquefying the methane produced at the top of the column,
  a means M2 for separating the liquefied methane into two portions: a "reflux" portion 6 and a "product" portion 5,
  a means M3 for expanding and heating the $CO_2$-enriched liquid recovered at the bottom of the column and for recovering the cold from the $CO_2$-enriched liquid, and
  a separator vessel V01 for receiving the $CO_2$-enriched stream from the means M3 and for recovering an overhead vapour and liquid $CO_2$ 7,
with
  the means M1 such that the recycle gas R corresponds to the overhead vapour recovered at the outlet of the separator vessel V01, and
  the exchanger E01 and the means M3 being combined.

Depending on the case, the facility according to the invention may have one or more of the following characteristics:
  the means M4 is the exchanger E01;
  the means M3 makes it possible to expand and heat the $CO_2$-enriched liquid from the separator vessel VOS;
  the facility comprises, upstream of the means M1, means for drying and desulfurization of the biogas;
  the facility comprises, upstream of the means M1, a means C01 for compressing the biogas to the pressure of the recycle gas R;
  the facility comprises, upstream of the means M1, a means C01E and/or C02E for cooling the biogas to ambient temperature;
  the exchanger E02 is within a closed refrigeration circuit;
  the refrigeration circuit uses methane as refrigerant fluid;

the distillation column K01 comprises heating at the bottom of the column.

The present invention also relates to a combined process of cryogenic separation and liquefaction of methane and carbon dioxide within a biogas stream, using the facility as defined previously, and comprising:
a. a step of mixing the biogas 1 with a recycle gas R,
b. a step of compressing the mixture to the distillation pressure,
c. a step of cooling the compressed mixture in the exchanger E01,
d. a step of separating the compressed mixture in the separator vessel V05 into overhead vapour 2 and $CO_2$-enriched liquid 3,
e. a step of cooling the overhead vapour 2,
f. a step of distilling the cooled overhead vapour 4 from step d) in the distillation column K01 so as to produce methane at the top of the column and a $CO_2$-enriched liquid at the bottom of the column,
g. a step of liquefying the methane produced at the top of the column in the exchanger E02,
h. a separation step for separating the liquefied methane into two portions: a "reflux" portion 6 and a "product" portion 5,
i. a step of expanding and heating the $CO_2$-enriched liquid recovered at the bottom of the column in the exchanger E01, and of recovering the cold from the $CO_2$-enriched liquid, and
j. a step of separating the $CO_2$-enriched stream resulting from the exchanger E01 in the separator vessel V01 into liquid $CO_2$ 7 and overhead vapour,
with the recycle gas R corresponding to the overhead vapour produced in step a).

Depending on the case, the process according to the invention may have one or more of the features below:
the process comprises, between steps f) and i), a step of introducing the $CO_2$-enriched liquid from the separator vessel V05 into the stream of $CO_2$-enriched liquid recovered at the bottom of the column;
the process comprises, upstream of step a), drying and desulfurization steps;
the process comprises, upstream of step a), a step of compressing the biogas to the pressure of the recycle gas R;
the process comprises, upstream of step a), a step of cooling the biogas to ambient temperature;
the process comprises, downstream of step j), a step of heating the liquid $CO_2$ so as to vaporize it;
the heating of the liquid $CO_2$ is performed in the exchanger E01;
step g) is performed by cooling the produced methane by means of a refrigerant fluid;
in step b), the mixture is compressed to a pressure of between 7 and 46 bar.

The process according to the invention makes it possible to separate and liquefy the products of the biogas in a single combined distillation/liquefaction operation. The operating conditions of the products at the inlet and outlet of the column and in the recycle section have been calculated to prevent the formation of solid $CO_2$.

The thermal integration between the streams of the separation section and those of the refrigeration cycle enable the recovery of the cold used in the liquefaction of the $CO_2$ and in the recycling of the liquid methane. It is possible to completely or partly recover the energy used in the liquefaction of the $CO_2$ if this $CO_2$ is not desired as a product or when it can be used in the gaseous state.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

FIG. 1 illustrates a refrigeration circuit in accordance with one embodiment of the present invention.

DETAILED DESCRIPTION OF PREFERRED EMBODIMENTS

The pretreated biogas 1 (pretreated by drying, desulfurization) is introduced into the process at atmospheric pressure and temperature, it is compressed a first time in a compressor C01, to the pressure of the recycle circuit (around 8 bar). After compression, it is cooled in C01E to ambient temperature with CW (=Cooling Water) or air.

Next, it is mixed with a recycle stream R, the mixture is compressed in a compressor C02, to the pressure of the distillation column (around 15 bar) or more depending on the requirements of the downstream exchanger E01 and it is cooled to ambient temperature in C02E, with CW or air.

Preferably, C01E and C02E are shell and tube exchangers (cooler of the compressors).

The mixture of biogas—recycle stream R is sent to the exchanger E01. This exchanger E01 firstly makes it possible to cool the mixture in preparation for the separation in the separator vessel V05 to a temperature of between −20° C. and −35° C., preferably between −25° C. and −33° C. (the objective is to remain at least 2 degrees above the equilibrium temperature of solid formation). The separator vessel V05 receives the mixture from the exchanger E01, and an overhead vapour 2 and a $CO_2$-enriched liquid 3 at the bottom of the vessel are recovered.

The overhead vapour 2 from the separator vessel V05 is then cooled to a temperature of between −45° C. and −55° C., preferably between −50° C. and −55° C., in the exchanger E01 (the objective is still to remain at least 2 degrees above the equilibrium temperature of solid formation). The cooled overhead vapour 4 can then directly supply the distillation column K01 at an intermediate stage.

A heat source is used at the bottom of the column (for example an electrical resistance heater, vapour or a portion of the hot biogas in indirect contact). The product at the top of the column is pure $CH_4$ in the vapour state. The bottom product is a liquid rich in $CO_2$, containing around 95%-98%.

The methane at the top of the column is liquefied in the exchanger E02, against a fluid from a closed refrigeration circuit. A portion 5 of the methane leaves the cycle as product and the other portion 6 (reflux portion) is used as recycle for the column and reinjected into the top of the column.

The $CO_2$-enriched liquid recovered at the bottom of the column is mixed with the $CO_2$-enriched liquid 3 from the separator vessel V05, then is expanded and heated in the exchanger E01 countercurrent to the biogas—recycle stream R mixture.

The $CO_2$-enriched stream from the exchanger E01 is sent to the separator vessel V01.

The overhead vapour of the vessel V01 is reheated in the exchanger E01 and then mixed with the biogas. It corresponds to the stream previously named "recycle stream R".

The liquid from the bottom of the vessel V01 is the pure $CO_2$ 7. This can, depending on the requirements, leave the process as product or be reheated in the exchanger E01 and in another exchanger E03 of the refrigeration circuit in order to be completely vaporized before leaving the cycle. Note that the pure $CO_2$ could alternatively be reheated and vaporised in the exchanger E03 without passing through the exchanger E01.

The exchanger E01 therefore uses, as sources of cold: the $CO_2$-enriched liquid recovered at the bottom of the column and the $CO_2$-enriched liquid from the separator vessel V05, the overhead vapour from the vessel V01 named "recycle stream R" at the outlet of the exchanger E01, and optionally the pure liquid $CO_2$ recovered at the bottom of the vessel V01 in the case where the vaporisation thereof is desired.

The process requires an input of refrigeration power in order to operate. This input of cold is represented in FIG. 1 by the refrigeration circuit: it is composed of:
- a compressor C03 with cooler C03E;
- an exchanger E03 which cools the compressed fluid using the recycled refrigerant fluid and the cold recovered from the separation cycle;
- a turbine ET01 and a JT valve PV05, for the expansion of the refrigerant fluid and production of cold;
- a separator vessel V02 separating the vapour and liquid phases of the refrigerant fluid;
- an exchanger E02 which uses the liquid phase of the refrigerant fluid to liquefy the biomethane at the top of the distillation column.

The refrigerant fluid used in the scheme is $CH_4$ but it can be replaced by other fluids such as $N_2$, $N_2+H_2$, inter alia.

This refrigeration cycle can be replaced by other sources of cold (depending on the amount of liquid biomethane to be produced). By way of example, but not exclusively:
- using a source of liquid nitrogen;
- by a Brayton cycle process.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A combined process of cryogenic separation and liquefaction of methane and carbon dioxide within a biogas stream, the process comprising:
   a. mixing a biogas stream with a recycle gas stream, thereby producing a mixed biogas stream,
   b. compressing the mixed biogas stream to a distillation pressure, thereby producing a compressed stream,
   c. cooling the compressed stream in a first exchanger, thereby producing a cooled stream,
   d. separating the cooled stream in a first separator vessel into an overhead vapour stream and a $CO_2$-enriched liquid stream,
   e. cooling the overhead vapour stream, thereby producing a cooled overhead vapor stream,
   f. distilling the cooled overhead vapour from step d) in a distillation column thereby producing a methane stream at the top of the distillation column and a first $CO_2$-enriched liquid stream at the bottom of the distillation column,
   g. liquefying the methane stream produced at the top of the distillation column in a second exchanger, thereby producing a liquefied methane stream,
   h. a separation step for separating the liquefied methane stream into two portions: a "reflux" portion and a "product" portion,
   i. expanding the first $CO_2$-enriched liquid stream and heating the expanded first $CO_2$-enriched liquid stream recovered at the bottom of the column in the first exchanger, and of recovering the cold from the $CO_2$-enriched liquid stream, thereby producing a second $CO_2$-enriched liquid stream, and
   j. separating the second $CO_2$-enriched stream into a liquid $CO_2$ stream and an overhead vapour stream,
   wherein the recycle gas stream corresponds to the overhead vapour stream produced in step a), further comprising, between steps f) and i), a step of introducing the $CO_2$-enriched liquid stream from the first separator vessel into the stream of $CO_2$-enriched liquid recovered at the bottom of the column.

2. The process according to claim 1, further comprising, upstream of step a), steps of drying and of desulfurization of the biogas stream.

3. The process according to claim 1, further comprising, upstream of step a), a step of compressing the biogas stream to the pressure of the recycle gas stream.

4. The process according to claim 1, further comprising, upstream of step a), a step of cooling the biogas stream to ambient temperature.

5. The process according to claim 1, further comprising, downstream of step j), a step of heating and vaporizing the liquid $CO_2$ stream.

6. The process according to claim 5, wherein heating of the liquid $CO_2$ stream is performed in the first exchanger.

7. The process according to claim 1, wherein step g) is performed by cooling the methane stream produced by means of a refrigerant fluid.

8. The process according to claim 1, wherein, in step b), the biogas stream is compressed to a pressure of between 7 and 46 bar.

* * * * *